US012626584B2

(12) United States Patent
Ahadh

(10) Patent No.: US 12,626,584 B2
(45) Date of Patent: May 12, 2026

(54) SYSTEMS AND METHODS FOR MITIGATING FALSE ALARMS IN A BUILDING MANAGEMENT SYSTEM

(71) Applicant: Honeywell International Inc., Charlotte, NC (US)

(72) Inventor: Abdhul Ahadh, Kozhikode (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 41 days.

(21) Appl. No.: 18/815,563

(22) Filed: Aug. 26, 2024

(65) Prior Publication Data

US 2026/0057763 A1     Feb. 26, 2026

(51) Int. Cl.
*G08B 29/18*          (2006.01)
*G06N 20/00*          (2019.01)

(52) U.S. Cl.
CPC ........... *G08B 29/185* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,451,005 B2 * | 11/2008 | Hoffberg | G06V 40/103 700/83 |
| 10,607,478 B1 | 3/2020 | Stewart et al. | |
| 12,088,599 B1 * | 9/2024 | McCarson | G06F 18/2133 |
| 12,126,643 B1 * | 10/2024 | Skarphedinsson | H04L 63/1441 |
| 12,242,937 B1 * | 3/2025 | Brown | G06N 3/045 |
| 12,323,449 B1 * | 6/2025 | Graves | G06F 9/545 |
| 12,348,545 B1 * | 7/2025 | Parikh | G06N 20/00 |
| 12,418,555 B1 * | 9/2025 | Skarphedinsson | G06N 20/00 |
| 2020/0202221 A1 | 6/2020 | Wang et al. | |
| 2022/0157138 A1 | 5/2022 | Metzler et al. | |
| 2023/0230469 A1 | 7/2023 | Schubert et al. | |

(Continued)

FOREIGN PATENT DOCUMENTS

| | | | | |
|---|---|---|---|---|
| WO | 2022/182345 A1 | 9/2022 | | |
| WO | 2024155584 A1 | 7/2024 | | |
| WO | WO-2025198949 A1 * | 9/2025 | ............ | B60W 50/14 |

OTHER PUBLICATIONS

Chenna, S., "Exploring the Synergy of Generative and Distributed AI in Multi-agent Systems", SSRN, Oct. 30, 2023, 6 pages.

(Continued)

*Primary Examiner* — Fekadeselassie Girma
(74) *Attorney, Agent, or Firm* — Seager, Tufte & Wickhem, LLP

(57)          ABSTRACT

An alarm is raised. One of a plurality of Generative Artificial Intelligence (AI) Large Language Model-based autonomous primary agents is activated based at least in part on an alarm type of the alarm and performs an initial analysis of the alarm and creates plausible causes for the alarm. The corresponding Generative AI Large Language Model-based autonomous primary agent autonomously assigns each of the plausible causes to one or more Generative AI Large Language Model-based autonomous subagents that perform an analysis of the assigned plausible cause and returns a result back to the Generative AI Large Language Model-based autonomous primary agent, which classifies the alarm as a false alarm or a true alarm.

20 Claims, 8 Drawing Sheets

(56)                References Cited

U.S. PATENT DOCUMENTS

| | | | | |
|---|---|---|---|---|
| 2023/0259821 A1* | 8/2023 | Travalini | ............. | G06N 3/0455 |
| | | | | 706/12 |
| 2024/0121254 A1* | 4/2024 | Gu | ......................... | G06N 5/022 |
| 2024/0345560 A1* | 10/2024 | Brown | .................. | G06F 11/079 |
| 2024/0346311 A1* | 10/2024 | Brown | ..................... | G06N 3/08 |
| 2025/0209571 A1* | 6/2025 | Kumar | ................... | G06V 20/70 |
| 2025/0249908 A1* | 8/2025 | Swartz | ................... | B60L 53/30 |
| 2025/0322733 A1* | 10/2025 | Swierkowski | ......... | G06V 40/18 |

OTHER PUBLICATIONS

Hall, S., "Case Study: Revolutionizing IT Monitoring with Generative AI and Smart Alerts", Transforming It With Generative AI Smart Alerts, available online at: <https://www.linkedin.com/pulse/case-study-revolutionizing-monitoring-generative-ai-hall-mba-cspo--d7wgc/?trackingId=ie3UsqlBReuryEltTLMH%2Bg%3D%3D>, Jan. 31, 2024, 12 pages.

Hong, S., et al., "MetaGPT: Meta Programming for a Multi-Agent Collaborative Framework", arXiv:2308.00352 [cs.AI], Nov. 6, 2023, 26 pages.

Hu, W., et al., "A priority-aware sequential pattern mining method for detection of compact patterns from alarm floods", Journal of Process Control, vol. 129, Sep. 2023, 14 pages.

Li, B., et al., "A semi-supervised approach to fault detection and diagnosis for building HVAC systems based on the modified generative adversarial network", Energy and Buildings, vol. 246, Sep. 1, 2021, 15 pages.

Li, D., et al., "MAD-GAN: Multivariate Anomaly Detection for Time Series Data with Generative Adversarial Networks", Lecture Notes in Computer Science, vol. 11730, Sep. 9, 2019, 17 pages.

Standen, B., "Tackling alarm overload: AI for smarter facility management", Brainbox AI, available online at: <https://brainboxai.com/en/articles/tackling-alarm-overload-ai-for-smarter-facility-management>, retrieved on Oct. 10, 2024, 8 pages.

Weng, Y., et al., "Multi-Agent-Based Unsupervised Detection of Energy Consumption Anomalies on Smart Campus", Novel Learning Applications and Services for Smart Campus, vol. 7, Nov. 29, 2018, 10 pages.

Wikipedia, "AutoGPT", available online at : <https://en.wikipedia.org/wiki/AutoGPT>, Sep. 23, 2024, 4 pages.

Wu, Q., et al., "AutoGen: Enabling Next-Gen LLM Applications via Multi-Agent Conversation", arXiv:2308.08155, Oct. 3, 2023, 43 pages.

Tri Nguyen, et al., "Large language models in 6G security: challenges and opportunities," Cornell University Library, Mar. 18, 2024, XP091703643 (29 pages).

Hamza Kheddar, "Transformers and Large Language Models for Efficient Intrusion Detection Systems: A Comprehensive Survey," Cornell University Library, Aug. 14, 2024, XP091851005 (34 pages).

* cited by examiner

Figure 2A:
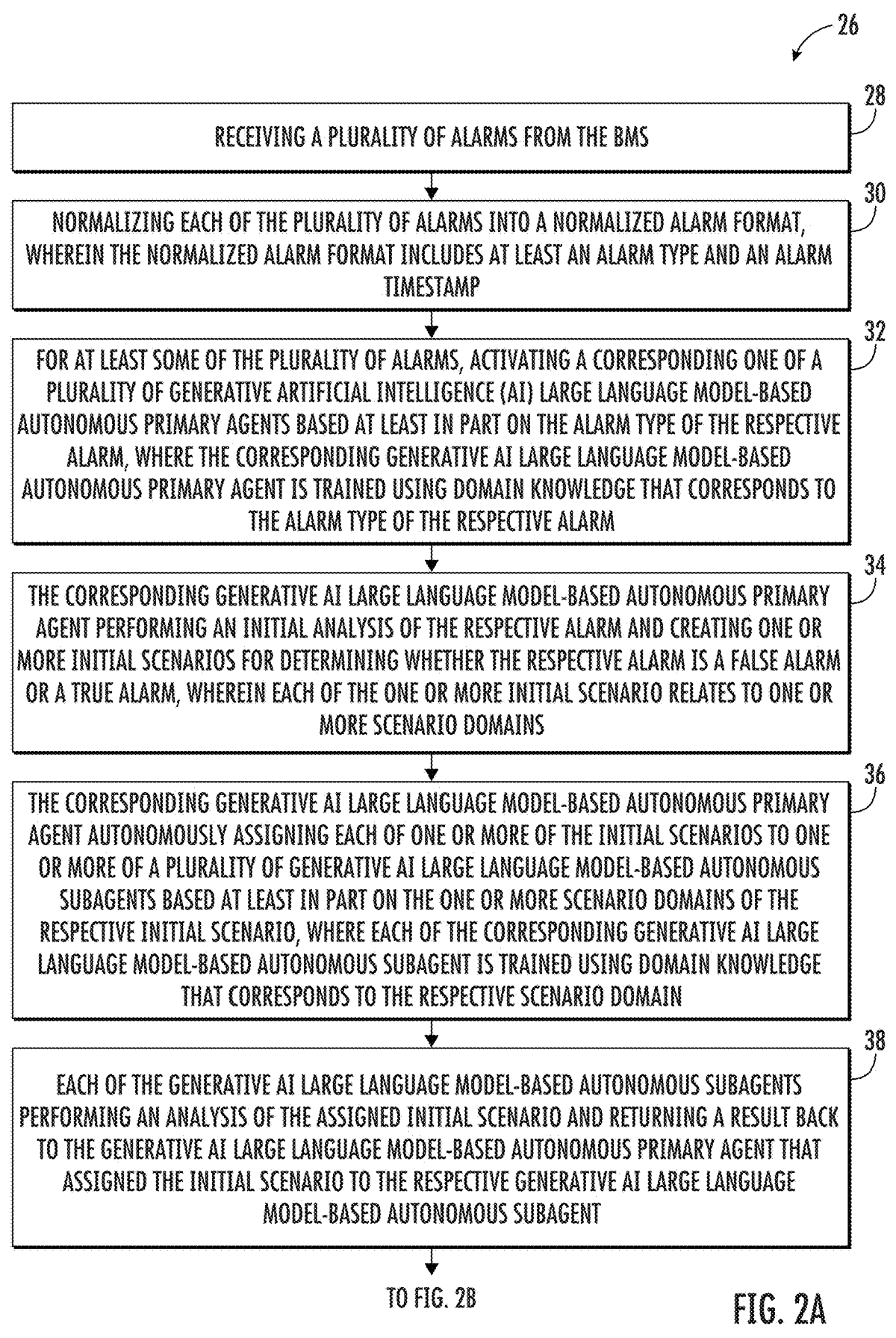

26

28

RECEIVING A PLURALITY OF ALARMS FROM THE BMS

30

NORMALIZING EACH OF THE PLURALITY OF ALARMS INTO A NORMALIZED ALARM FORMAT, WHEREIN THE NORMALIZED ALARM FORMAT INCLUDES AT LEAST AN ALARM TYPE AND AN ALARM TIMESTAMP

32

FOR AT LEAST SOME OF THE PLURALITY OF ALARMS, ACTIVATING A CORRESPONDING ONE OF A PLURALITY OF GENERATIVE ARTIFICIAL INTELLIGENCE (AI) LARGE LANGUAGE MODEL-BASED AUTONOMOUS PRIMARY AGENTS BASED AT LEAST IN PART ON THE ALARM TYPE OF THE RESPECTIVE ALARM, WHERE THE CORRESPONDING GENERATIVE AI LARGE LANGUAGE MODEL-BASED AUTONOMOUS PRIMARY AGENT IS TRAINED USING DOMAIN KNOWLEDGE THAT CORRESPONDS TO THE ALARM TYPE OF THE RESPECTIVE ALARM

34

THE CORRESPONDING GENERATIVE AI LARGE LANGUAGE MODEL-BASED AUTONOMOUS PRIMARY AGENT PERFORMING AN INITIAL ANALYSIS OF THE RESPECTIVE ALARM AND CREATING ONE OR MORE INITIAL SCENARIOS FOR DETERMINING WHETHER THE RESPECTIVE ALARM IS A FALSE ALARM OR A TRUE ALARM, WHEREIN EACH OF THE ONE OR MORE INITIAL SCENARIO RELATES TO ONE OR MORE SCENARIO DOMAINS

36

THE CORRESPONDING GENERATIVE AI LARGE LANGUAGE MODEL-BASED AUTONOMOUS PRIMARY AGENT AUTONOMOUSLY ASSIGNING EACH OF ONE OR MORE OF THE INITIAL SCENARIOS TO ONE OR MORE OF A PLURALITY OF GENERATIVE AI LARGE LANGUAGE MODEL-BASED AUTONOMOUS SUBAGENTS BASED AT LEAST IN PART ON THE ONE OR MORE SCENARIO DOMAINS OF THE RESPECTIVE INITIAL SCENARIO, WHERE EACH OF THE CORRESPONDING GENERATIVE AI LARGE LANGUAGE MODEL-BASED AUTONOMOUS SUBAGENT IS TRAINED USING DOMAIN KNOWLEDGE THAT CORRESPONDS TO THE RESPECTIVE SCENARIO DOMAIN

38

EACH OF THE GENERATIVE AI LARGE LANGUAGE MODEL-BASED AUTONOMOUS SUBAGENTS PERFORMING AN ANALYSIS OF THE ASSIGNED INITIAL SCENARIO AND RETURNING A RESULT BACK TO THE GENERATIVE AI LARGE LANGUAGE MODEL-BASED AUTONOMOUS PRIMARY AGENT THAT ASSIGNED THE INITIAL SCENARIO TO THE RESPECTIVE GENERATIVE AI LARGE LANGUAGE MODEL-BASED AUTONOMOUS SUBAGENT

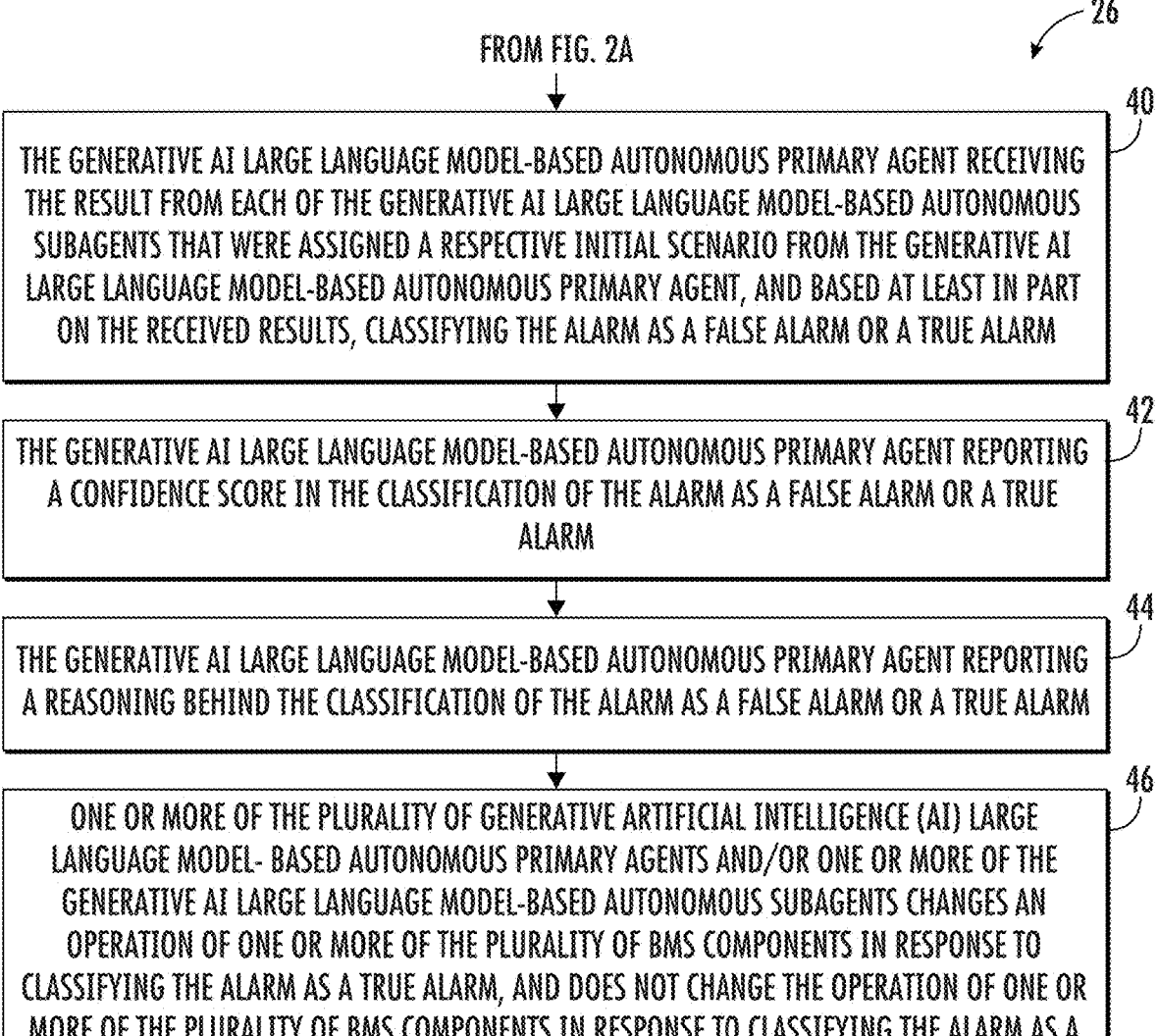

FROM FIG. 2A

— 26

40

THE GENERATIVE AI LARGE LANGUAGE MODEL-BASED AUTONOMOUS PRIMARY AGENT RECEIVING THE RESULT FROM EACH OF THE GENERATIVE AI LARGE LANGUAGE MODEL-BASED AUTONOMOUS SUBAGENTS THAT WERE ASSIGNED A RESPECTIVE INITIAL SCENARIO FROM THE GENERATIVE AI LARGE LANGUAGE MODEL-BASED AUTONOMOUS PRIMARY AGENT, AND BASED AT LEAST IN PART ON THE RECEIVED RESULTS, CLASSIFYING THE ALARM AS A FALSE ALARM OR A TRUE ALARM

42

THE GENERATIVE AI LARGE LANGUAGE MODEL-BASED AUTONOMOUS PRIMARY AGENT REPORTING A CONFIDENCE SCORE IN THE CLASSIFICATION OF THE ALARM AS A FALSE ALARM OR A TRUE ALARM

44

THE GENERATIVE AI LARGE LANGUAGE MODEL-BASED AUTONOMOUS PRIMARY AGENT REPORTING A REASONING BEHIND THE CLASSIFICATION OF THE ALARM AS A FALSE ALARM OR A TRUE ALARM

46

ONE OR MORE OF THE PLURALITY OF GENERATIVE ARTIFICIAL INTELLIGENCE (AI) LARGE LANGUAGE MODEL- BASED AUTONOMOUS PRIMARY AGENTS AND/OR ONE OR MORE OF THE GENERATIVE AI LARGE LANGUAGE MODEL-BASED AUTONOMOUS SUBAGENTS CHANGES AN OPERATION OF ONE OR MORE OF THE PLURALITY OF BMS COMPONENTS IN RESPONSE TO CLASSIFYING THE ALARM AS A TRUE ALARM, AND DOES NOT CHANGE THE OPERATION OF ONE OR MORE OF THE PLURALITY OF BMS COMPONENTS IN RESPONSE TO CLASSIFYING THE ALARM AS A FALSE ALARM

Figure 3A:
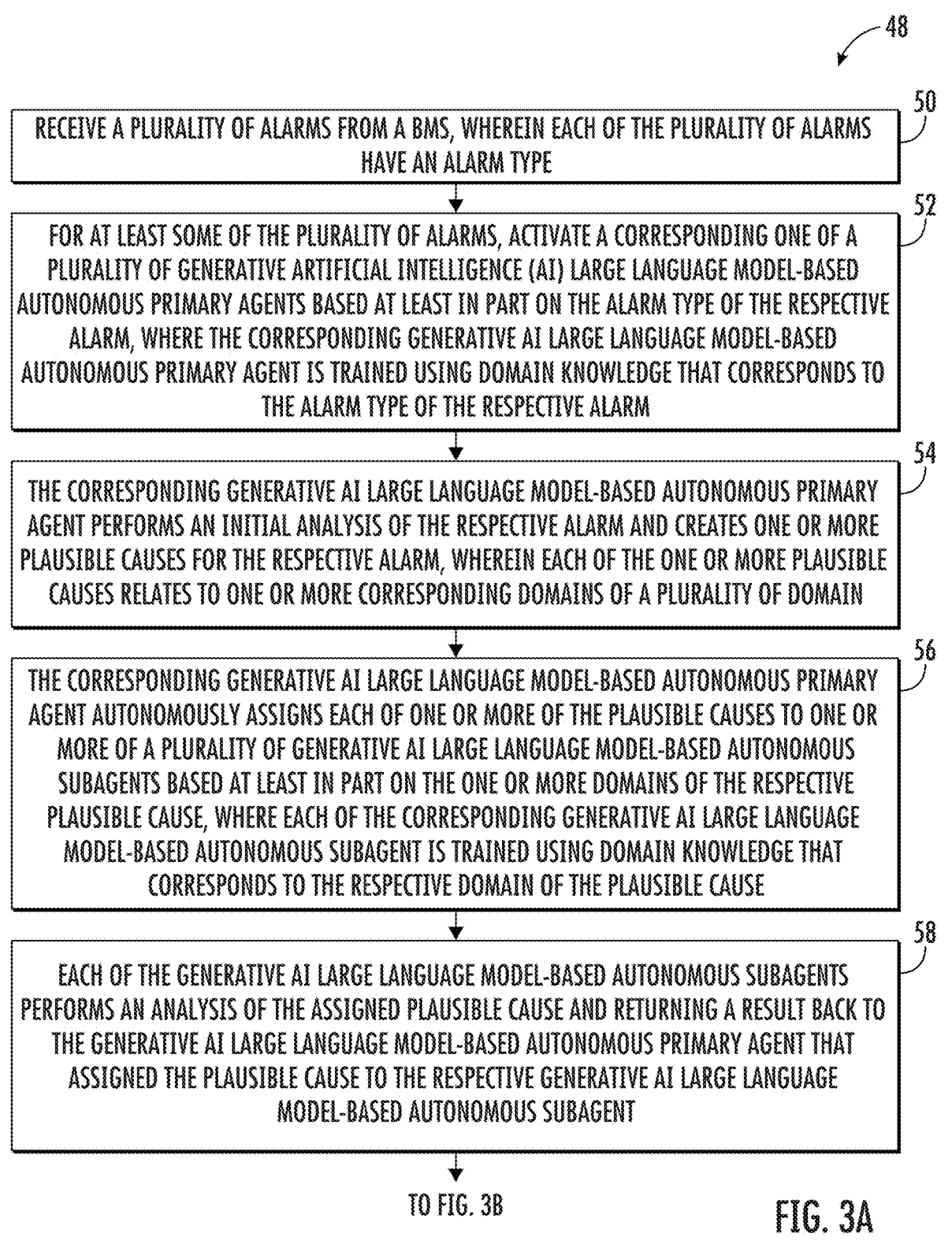

RECEIVE A PLURALITY OF ALARMS FROM A BMS, WHEREIN EACH OF THE PLURALITY OF ALARMS HAVE AN ALARM TYPE

52

FOR AT LEAST SOME OF THE PLURALITY OF ALARMS, ACTIVATE A CORRESPONDING ONE OF A PLURALITY OF GENERATIVE ARTIFICIAL INTELLIGENCE (AI) LARGE LANGUAGE MODEL-BASED AUTONOMOUS PRIMARY AGENTS BASED AT LEAST IN PART ON THE ALARM TYPE OF THE RESPECTIVE ALARM, WHERE THE CORRESPONDING GENERATIVE AI LARGE LANGUAGE MODEL-BASED AUTONOMOUS PRIMARY AGENT IS TRAINED USING DOMAIN KNOWLEDGE THAT CORRESPONDS TO THE ALARM TYPE OF THE RESPECTIVE ALARM

54

THE CORRESPONDING GENERATIVE AI LARGE LANGUAGE MODEL-BASED AUTONOMOUS PRIMARY AGENT PERFORMS AN INITIAL ANALYSIS OF THE RESPECTIVE ALARM AND CREATES ONE OR MORE PLAUSIBLE CAUSES FOR THE RESPECTIVE ALARM, WHEREIN EACH OF THE ONE OR MORE PLAUSIBLE CAUSES RELATES TO ONE OR MORE CORRESPONDING DOMAINS OF A PLURALITY OF DOMAIN

56

THE CORRESPONDING GENERATIVE AI LARGE LANGUAGE MODEL-BASED AUTONOMOUS PRIMARY AGENT AUTONOMOUSLY ASSIGNS EACH OF ONE OR MORE OF THE PLAUSIBLE CAUSES TO ONE OR MORE OF A PLURALITY OF GENERATIVE AI LARGE LANGUAGE MODEL-BASED AUTONOMOUS SUBAGENTS BASED AT LEAST IN PART ON THE ONE OR MORE DOMAINS OF THE RESPECTIVE PLAUSIBLE CAUSE, WHERE EACH OF THE CORRESPONDING GENERATIVE AI LARGE LANGUAGE MODEL-BASED AUTONOMOUS SUBAGENT IS TRAINED USING DOMAIN KNOWLEDGE THAT CORRESPONDS TO THE RESPECTIVE DOMAIN OF THE PLAUSIBLE CAUSE

58

EACH OF THE GENERATIVE AI LARGE LANGUAGE MODEL-BASED AUTONOMOUS SUBAGENTS PERFORMS AN ANALYSIS OF THE ASSIGNED PLAUSIBLE CAUSE AND RETURNING A RESULT BACK TO THE GENERATIVE AI LARGE LANGUAGE MODEL-BASED AUTONOMOUS PRIMARY AGENT THAT ASSIGNED THE PLAUSIBLE CAUSE TO THE RESPECTIVE GENERATIVE AI LARGE LANGUAGE MODEL-BASED AUTONOMOUS SUBAGENT

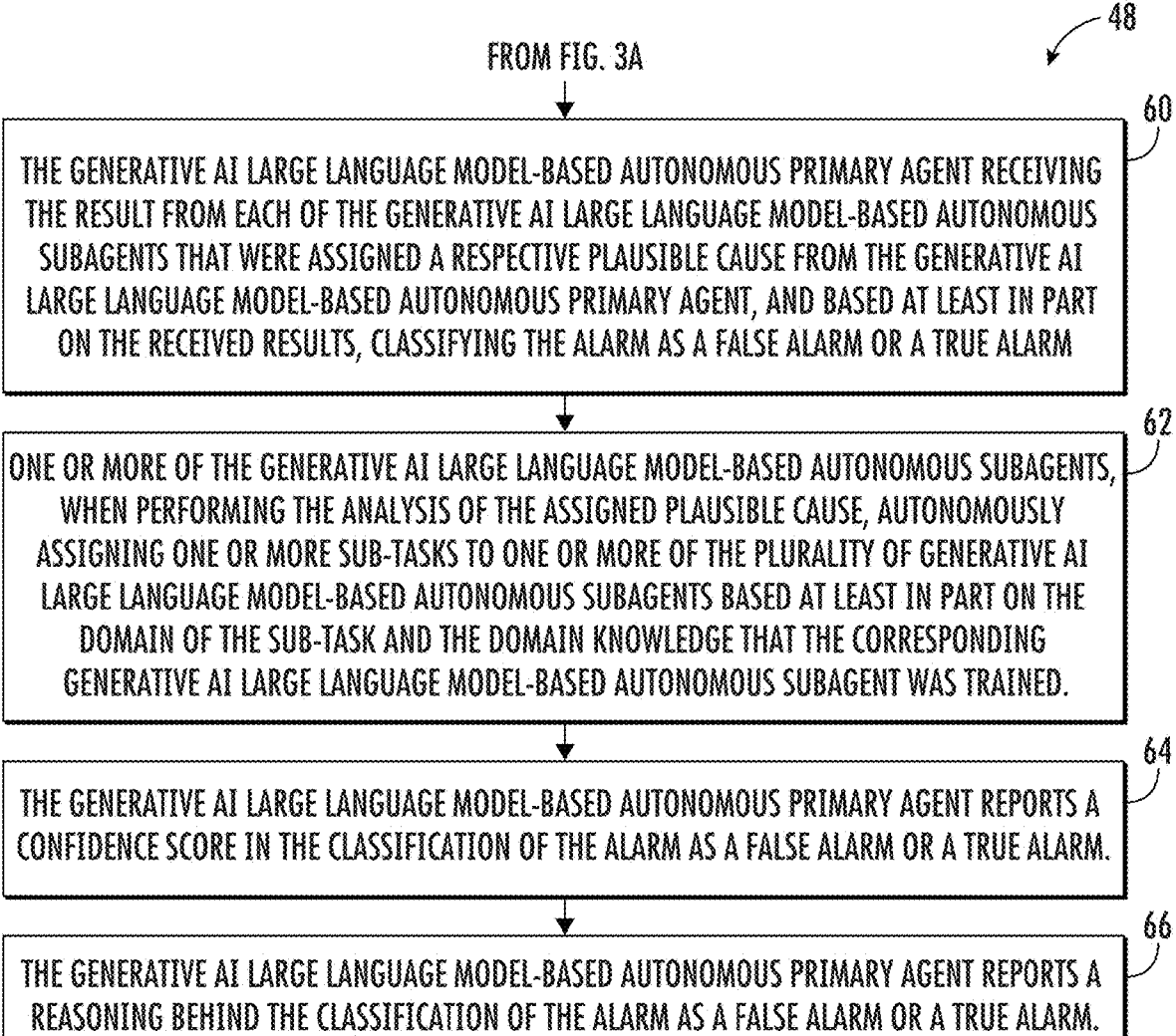

FROM FIG. 3A

48

60

THE GENERATIVE AI LARGE LANGUAGE MODEL-BASED AUTONOMOUS PRIMARY AGENT RECEIVING THE RESULT FROM EACH OF THE GENERATIVE AI LARGE LANGUAGE MODEL-BASED AUTONOMOUS SUBAGENTS THAT WERE ASSIGNED A RESPECTIVE PLAUSIBLE CAUSE FROM THE GENERATIVE AI LARGE LANGUAGE MODEL-BASED AUTONOMOUS PRIMARY AGENT, AND BASED AT LEAST IN PART ON THE RECEIVED RESULTS, CLASSIFYING THE ALARM AS A FALSE ALARM OR A TRUE ALARM

62

ONE OR MORE OF THE GENERATIVE AI LARGE LANGUAGE MODEL-BASED AUTONOMOUS SUBAGENTS, WHEN PERFORMING THE ANALYSIS OF THE ASSIGNED PLAUSIBLE CAUSE, AUTONOMOUSLY ASSIGNING ONE OR MORE SUB-TASKS TO ONE OR MORE OF THE PLURALITY OF GENERATIVE AI LARGE LANGUAGE MODEL-BASED AUTONOMOUS SUBAGENTS BASED AT LEAST IN PART ON THE DOMAIN OF THE SUB-TASK AND THE DOMAIN KNOWLEDGE THAT THE CORRESPONDING GENERATIVE AI LARGE LANGUAGE MODEL-BASED AUTONOMOUS SUBAGENT WAS TRAINED.

64

THE GENERATIVE AI LARGE LANGUAGE MODEL-BASED AUTONOMOUS PRIMARY AGENT REPORTS A CONFIDENCE SCORE IN THE CLASSIFICATION OF THE ALARM AS A FALSE ALARM OR A TRUE ALARM.

66

THE GENERATIVE AI LARGE LANGUAGE MODEL-BASED AUTONOMOUS PRIMARY AGENT REPORTS A REASONING BEHIND THE CLASSIFICATION OF THE ALARM AS A FALSE ALARM OR A TRUE ALARM.

FIG. 3B

SYSTEMS AND METHODS FOR MITIGATING FALSE ALARMS IN A BUILDING MANAGEMENT SYSTEM

TECHNICAL FIELD

The present disclosure relates generally to building management systems and more particularly to mitigating false alarms in a building management system.

BACKGROUND

Building Management Systems are systems that control and/or monitor a building or other facility. Building Management Systems may include, for example, an HVAC system, a security system, a video management system, an access control system, a fire system, and/or any other suitable Building Control System. In many cases, a Building Management System raises an alarm when an abnormality is detected in the building and/or an abnormality is detected in the operation of the Building Management System. The alarms must typically be acknowledged and/or otherwise addressed by an operator or other personnel of the building. In some cases, the Building Management System may issue an alarm indicating a potential issue or problem is occurring even though no such issue or problem is actually occurring in the building. These alarms can be referred to as false alarms. When a false alarm occurs, an operator typically needs to respond to the false alarm, which can waste considerable time of the operator and can pull the operator's attention away from actual true alarms. What would be desirable are methods and systems for automatically determining whether an alarm is a false alarm or a true alarm.

SUMMARY

The present disclosure relates generally to building management systems and more particularly to mitigating false alarms in a building management system. An example may be found in a method for processing of alarms of a Building Management System (BMS) of a facility, wherein the BMS includes a plurality of BMS components placed at known locations about the facility and the plurality of BMS components include a plurality of sensors. The illustrative method includes receiving a plurality of alarms from the BMS and normalizing each of the plurality of alarms into a normalized alarm format, wherein the normalized alarm format includes at least an alarm type and an alarm timestamp. For at least some of the plurality of alarms, a corresponding one of a plurality of Generative Artificial Intelligence (AI) Large Language Model-based autonomous primary agents is activated based at least in part on the alarm type of the respective alarm, where the corresponding Generative AI Large Language Model-based autonomous primary agent is trained using domain knowledge that corresponds to the alarm type of the respective alarm. The corresponding Generative AI Large Language Model-based autonomous primary agent performs an initial analysis of the respective alarm and creates one or more initial scenarios for determining whether the respective alarm is a false alarm or a true alarm, wherein each of the one or more initial scenario relates to one or more scenario domains. The corresponding Generative AI Large Language Model-based autonomous primary agent autonomously assigns each of one or more of the initial scenarios to one or more of a plurality of Generative AI Large Language Model-based autonomous subagents based at least in part on the one or more scenario domains of the respective initial scenario, where each of the corresponding Generative AI Large Language Model-based autonomous subagent is trained using domain knowledge that corresponds to the respective scenario domain. Each of the Generative AI Large Language Model-based autonomous subagents perform an analysis of the assigned initial scenario and return a result back to the Generative AI Large Language Model-based autonomous primary agent that assigned the initial scenario to the respective Generative AI Large Language Model-based autonomous subagent. The Generative AI Large Language Model-based autonomous primary agent receives the result from each of the Generative AI Large Language Model-based autonomous subagents that were assigned a respective initial scenario from the Generative AI Large Language Model-based autonomous primary agent, and based at least in part on the received results, classifies the alarm as a false alarm or a true alarm.

Another example may be found in a system for alarm processing of alarms of a Building Management System (BMS) of a facility, wherein the BMS includes a plurality of BMS components placed at known locations about the facility and the plurality of BMS components include a plurality of sensors. The system includes an input/output and a controller that is operatively coupled to the input/output. The controller is configured to receive a plurality of alarms from the BMS via the input/output, wherein each of the plurality of alarms has an alarm type. For at least some of the plurality of alarms, the controller is configured to activate a corresponding one of a plurality of Generative Artificial Intelligence (AI) Large Language Model-based autonomous primary agents based at least in part on the alarm type of the respective alarm, where the corresponding Generative AI Large Language Model-based autonomous primary agent is trained using domain knowledge that corresponds to the alarm type of the respective alarm. The corresponding Generative AI Large Language Model-based autonomous primary agent performs an initial analysis of the respective alarm and creates one or more plausible causes for the respective alarm, wherein each of the one or more plausible causes relates to one or more corresponding domains of a plurality of domains. The corresponding Generative AI Large Language Model-based autonomous primary agent autonomously assigns each of one or more of the plausible causes to one or more of a plurality of Generative AI Large Language Model-based autonomous subagents based at least in part on the one or more domains of the respective plausible cause, where each of the corresponding Generative AI Large Language Model-based autonomous subagent is trained using domain knowledge that corresponds to the respective domain of the plausible cause. Each of the Generative AI Large Language Model-based autonomous subagents performs an analysis of the assigned plausible cause and returns a result back to the Generative AI Large Language Model-based autonomous primary agent that assigned the plausible cause to the respective Generative AI Large Language Model-based autonomous subagent. The Generative AI Large Language Model-based autonomous primary agent receives the result from each of the Generative AI Large Language Model-based autonomous subagents that were assigned a respective plausible cause from the Generative AI Large Language Model-based autonomous primary agent, and based at least in part on the received results, classifies the alarm as a false alarm or a true alarm.

Another example may be found in a non-transitory computer readable medium storing instructions. When the instructions are executed by one or more processors, the one or more processors are caused to receive a plurality of alarms from a BMS, wherein each of the plurality of alarms have an alarm type. For at least some of the plurality of alarms, the one or more processors are caused to activate a corresponding one of a plurality of Generative Artificial Intelligence (AI) Large Language Model-based autonomous primary agents based at least in part on the alarm type of the respective alarm, where the corresponding Generative AI Large Language Model-based autonomous primary agent is trained using domain knowledge that corresponds to the alarm type of the respective alarm. The corresponding Generative AI Large Language Model-based autonomous primary agent performs an initial analysis of the respective alarm and creates one or more plausible causes for the respective alarm, wherein each of the one or more plausible causes relates to one or more corresponding domains of a plurality of domains. The corresponding Generative AI Large Language Model-based autonomous primary agent autonomously assigns each of one or more of the plausible causes to one or more of a plurality of Generative AI Large Language Model-based autonomous subagents based at least in part on the one or more domains of the respective plausible cause, where each of the corresponding Generative AI Large Language Model-based autonomous subagent is trained using domain knowledge that corresponds to the respective domain of the plausible cause. Each of the Generative AI Large Language Model-based autonomous subagents performs an analysis of the assigned plausible cause and returns a result back to the Generative AI Large Language Model-based autonomous primary agent that assigned the plausible cause to the respective Generative AI Large Language Model-based autonomous subagent. The Generative AI Large Language Model-based autonomous primary agent receives the result from each of the Generative AI Large Language Model-based autonomous subagents that were assigned a respective plausible cause from the Generative AI Large Language Model-based autonomous primary agent, and based at least in part on the received results, classifies the alarm as a false alarm or a true alarm.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIGS. 2A and 2B are flow diagrams that together show an illustrative method for processing alarms;

FIGS. 3A and 3B are flow diagrams that together show an illustrative series of steps that may be carried out by one or more processors that are executing instructions stored on a non-transitory computer readable medium.

Figure 1:
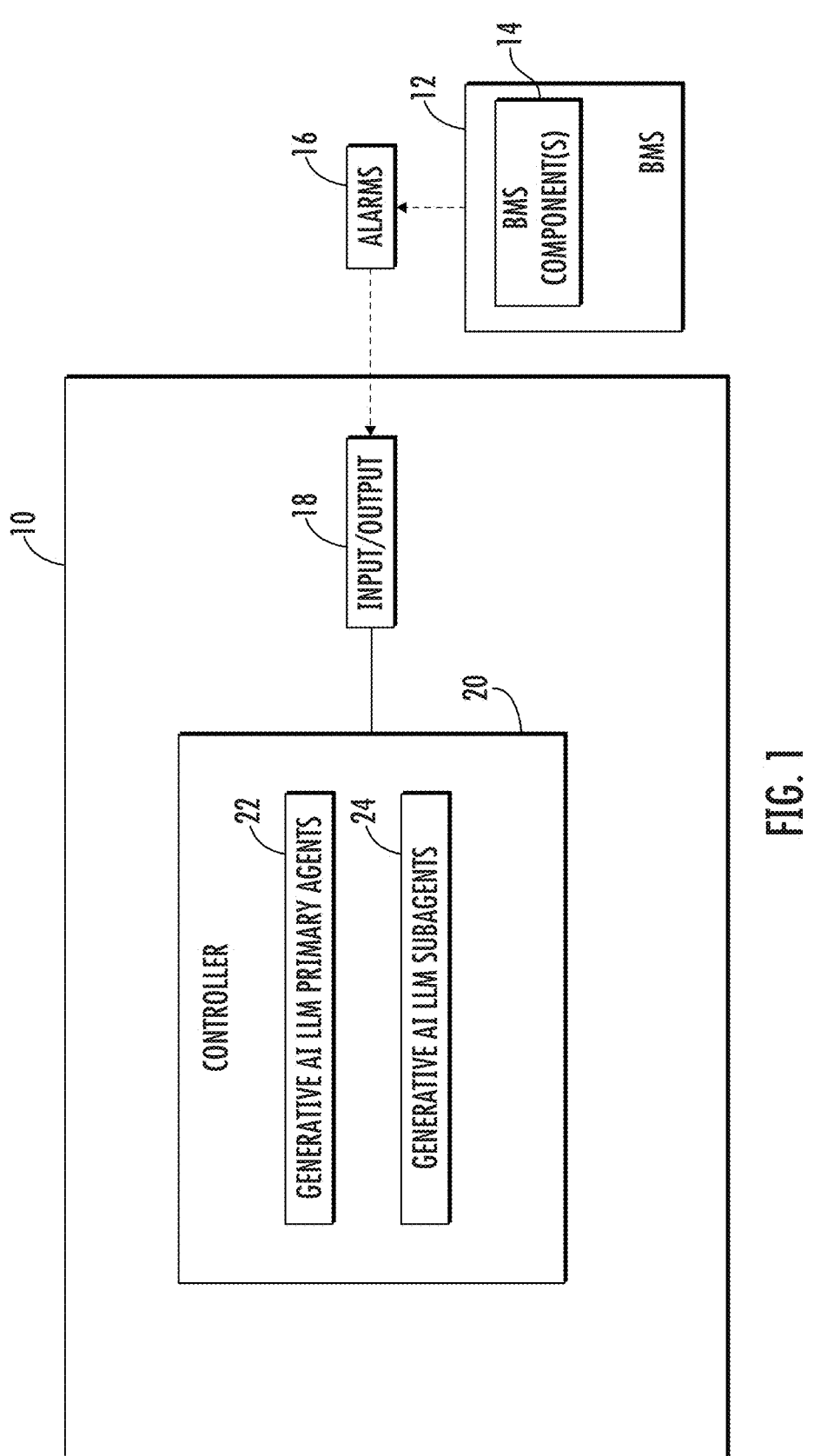
FIG. 1 is a schematic block diagram showing an illustrative system for processing alarms from a Building Management System (BMS)

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative system 10 for processing alarms from a Building Management System (BMS) 12 of a facility. The BMS system 12 may include, for example, an HVAC system, a security system, a video management system, an access control system, a fire system, and/or any other suitable Building Control System. The BMS 12 includes a number of BMS components 14 that are placed at known locations around the facility. In some cases, the BMS components 14 include a number of sensors such as but not limited to window open sensors, door open sensors, glass break detectors, motion detectors, fire sensors, smoke sensors, gas sensors, temperature sensors, humidity sensors and the like. The sensors may include video cameras and associated video analytics algorithms. In some cases, some or all of the sensors may be battery-powered. The BMS components 14 may detect conditions from which one or more alarms 16 may be generated. The alarms 16 may be provided to the system 10. As will be appreciated, some of the alarms 16 may be false alarms, meaning that no problem is actually occurring and it may simply be a sensor error or other condition, and some of the alarms 16 may be true alarms, meaning that there is a problem occurring. The system 10 processes the alarms 16 to help determine which of the alarms 16 are false alarms and which are true alarms.

The illustrative system 10 includes an input/output 18 by which the system 10 receives the alarms 16 from the BMS 12. In some cases, the input/output 18 may be used to send communications including commands to the BMS 12. A controller 20 is operatively coupled to the input/output 18. In some cases, the controller 20 may be considered as including a number of generative Artificial Intelligence (AI) Large Language Model primary agents 22 and a number of generative Artificial Intelligence (AI) Large Language Model (LLM) subagents 24. In some cases, one or more of the generative AI Large Language Model primary agents 22 and/or one or more of the generative AI Large Language Model subagents 24 may be locally stored. In some cases, one or more of the generative AI Large Language Model primary agents 22 and/or one or more of the generative AI Large Language Model subagents 24 may be stored in a remote or cloud-based server (not shown) that is in communication with the controller 20.

The controller 20 is configured to receive a plurality of alarms from the BMS 12 via the input/output 18, where each of the plurality of alarms has an alarm type. Sometimes, the alarm type corresponds to and/or is derived from the type of sensor(s) that detected the corresponding alarm condition. For at least some of the plurality of alarms, the controller 20 is configured to activate a corresponding one of a plurality of Generative Artificial Intelligence (AI) Large Language Model-based autonomous primary agents 22 based at least in part on the alarm type of the respective alarm 16, where the corresponding Generative AI Large Language Model-based autonomous primary agent 22 is trained using domain knowledge that corresponds to the alarm type of the respective alarm. For example, if the alarm type is a security system alarm type, the corresponding Generative AI Large Language Model-based autonomous primary agent 22 may be trained using domain knowledge that corresponds to security systems. In some cases, the corresponding Generative AI Large Language Model autonomous primary agent 22 performs an initial analysis of the respective alarm 16 and creates one or more plausible causes for the respective alarm 16, wherein each of the one or more plausible causes relates to one or more corresponding domains of a plurality of domains. In some cases, the corresponding Generative AI Large Language Model-based autonomous primary agent 22 autonomously assigns each of one or more of the plausible causes to one or more of a plurality of Generative AI Large Language Model-based autonomous subagents 24 based at least in part on the one or more domains of the respective plausible cause, where each of the corresponding Generative AI Large Language Model-based autonomous subagent 24 is trained using domain knowledge that corresponds to the respective domain of the plausible cause. In some instances, each of the Generative AI Large Language Model-based autonomous subagents 24 performs an analysis of the assigned plausible cause and return a result back to the Generative AI Large Language Model-based autonomous primary agent 22 that assigned the plausible cause to the respective Generative AI Large Language Model-based autonomous subagent 24. In some cases, the Generative AI Large Language Model-based autonomous primary agent 22 receives the result from each of the Generative AI Large Language Model-based autonomous subagents 24 that were assigned a respective plausible cause from the Generative AI Large Language Model-based autonomous primary agent 22, and based at least in part on the received results, classifies the alarm 16 as a false alarm or a true alarm.

In some cases, one or more of the Generative AI Large Language Model-based autonomous subagents 24, when performing the analysis of the assigned plausible cause, autonomously assigning one or more sub-tasks to one or more of other of the plurality of Generative AI Large Language Model-based autonomous subagents 24 based at least in part on the domain of the sub-task and the domain knowledge upon which the corresponding Generative AI Large Language Model-based autonomous subagent 24 was trained. In some cases, the Generative AI Large Language Model-based autonomous primary agent 22 may report a confidence score in the classification of the alarm as a false alarm or a true alarm. In some cases, the Generative AI Large Language Model-based autonomous primary agent 22 may report a reasoning (e.g. text based description of the reasoning) behind the classification of the alarm as a false alarm or a true alarm. In some cases, one or more of the plurality of Generative Artificial Intelligence (AI) Large Language Model-based autonomous primary agents 22 and/or one or more of the Generative AI Large Language Model-based autonomous subagents 24 may gather data from one or more of the plurality of BMS components 14 of the BMS 12, and the Generative AI Large Language Model-based autonomous primary agent 22 may report gathered data that support the classification of the alarm 16 as a false alarm or a true alarm.

In some cases, one or more of the plurality of BMS components 14 may include one or more Video Management System (VMS) components of a Video Management System (VMS) of the BMS 12, and one of the Generative AI Large Language Model-based autonomous subagents 24 may be a Video Management System (VMS) Analyzer subagent that is trained using domain knowledge related to the Video Management System (VMS) of the BMS 12. In some cases, one or more of the plurality of BMS components 14 may include one or more Fire Detection components of a Fire Detection System of the BMS 12, and one of the Generative AI Large Language Model-based autonomous subagents 24 may be a Fire Detection Analyzer subagent that is trained using domain knowledge related to the Fire Detection System of the BMS 12. In some cases, one or more of the plurality of BMS components 14 may include one or more Security System components of a Security System of the BMS 12, and one of the Generative AI Large Language Model-based autonomous subagents 24 may be a Security System Analyzer subagent that is trained using domain knowledge related to the Security System of the BMS 12. In some cases, one or more of the plurality of BMS components 14 may include one or more Heating, Ventilation and/or Air Conditioning (HVAC) components of an HVAC system of the BMS 12, and one of the Generative AI Large Language Model-based autonomous subagents 24 may be an HVAC Analyzer subagent that is trained using domain knowledge related to the HVAC system of the BMS 12. These are just examples. In some cases, the Generative AI Large Language Model-based autonomous primary agents and/or Generative AI Large Language Model-based autonomous subagents trained in a certain domain (e.g. Fire Detection Systems) may gather information from and/or assign task to one or more Generative AI Large Language Model-based autonomous primary agents and/or Generative AI Large Language Model-based autonomous subagents that are trained in one or more different domains (Video Management Systems, HVAC systems).

FIGS. 2A and 2B are flow diagrams that together show an illustrative method 26 for alarm processing of alarms (such as the alarms 16) of a Building Management System (BMS) (such as the BMS 12) of a facility, wherein the BMS includes a plurality of BMS components (such as the BMS components 14) placed at known locations about the facility where the plurality of BMS components include a plurality of sensors. In some cases, one or more of the plurality of BMS components may include one or more Video Management System (VMS) components of a Video Management System (VMS) of the BMS, and one of the Generative AI Large Language Model-based autonomous subagents may be a Video Management System (VMS) Analyzer subagent that is trained using domain knowledge related to the Video Management System (VMS) of the BMS. In some cases, one or more of the plurality of BMS components may include one or more Fire Detection components of a Fire Detection System of the BMS, and one of the Generative AI Large Language Model-based autonomous subagents may be a Fire Detection Analyzer subagent that is trained using domain knowledge related to the Fire Detection System of the BMS. In some cases, one or more of the plurality of BMS components may include one or more Security System components of a Security System of the BMS, and one of the Generative AI Large Language Model-based autonomous subagents may be a Security System Analyzer subagent that is trained using domain knowledge related to the Security System of the BMS. In some cases, one or more of the plurality of BMS components may include one or more Heating, Ventilation and/or Air Conditioning (HVAC) components of an HVAC system of the BMS, and one of the Generative AI Large Language Model-based autonomous subagents may be an HVAC Analyzer subagent that is trained using domain knowledge related to the HVAC system of the BMS. These are just examples.

The illustrative method 26 includes receiving a plurality of alarms from the BMS, as indicated at block 28. Each of the plurality of alarms are normalized into a normalized alarm format, wherein the normalized alarm format includes at least an normalized alarm type and a normalized alarm timestamp, as indicated at block 30. For at least some of the plurality of alarms, a corresponding one of a plurality of Generative Artificial Intelligence (AI) Large Language Model-based autonomous primary agents (such as the Generative AI Large Language Model-based autonomous primary agents 22) is activated based at least in part on the alarm type of the respective alarm, where the corresponding Generative AI Large Language Model-based autonomous primary agent is trained using domain knowledge that corresponds to the alarm type of the respective alarm, as indicated at block 32.

The corresponding Generative AI Large Language Model-based autonomous primary agent performs an initial analysis of the respective alarm and creates one or more initial scenarios for determining whether the respective alarm is a false alarm or a true alarm, wherein each of the one or more initial scenario relates to one or more scenario domains, as indicated at block 34. The corresponding Generative AI Large Language Model-based autonomous primary agent autonomously assigns each of one or more of the initial scenarios to one or more of a plurality of Generative AI Large Language Model-based autonomous subagents (such as the Generative AI Large Language Model-based autonomous subagents 24) based at least in part on the one or more scenario domains of the respective initial scenario, where each of the corresponding Generative AI Large Language Model-based autonomous subagent is trained using domain knowledge that corresponds to the respective scenario domain, as indicated at block 36. Each of the Generative AI Large Language Model-based autonomous subagents perform an analysis of the assigned initial scenario and returning a result back to the Generative AI Large Language Model-based autonomous primary agent that assigned the initial scenario to the respective Generative AI Large Language Model-based autonomous subagent, as indicated at block 38.

Continuing on FIG. 2B, the Generative AI Large Language Model-based autonomous primary agent receives the result from each of the Generative AI Large Language Model-based autonomous subagents that were assigned a respective initial scenario from the Generative AI Large Language Model-based autonomous primary agent, and based at least in part on the received results, classifies the alarm as a false alarm or a true alarm, as indicated at block 40. In some cases, one or more of the Generative AI Large Language Model-based autonomous subagents, when performing the analysis of the assigned initial scenario, may autonomously assign one or more sub-tasks to one or more of the plurality of Generative AI Large Language Model-based autonomous subagents based at least in part on the domain of the sub-task and the domain knowledge that the corresponding Generative AI Large Language Model-based autonomous subagent was trained.

In some cases, the method 26 may further include the Generative AI Large Language Model-based autonomous primary agent reporting a confidence score in the classification of the alarm as a false alarm or a true alarm, as indicated at block 42. In some cases, the method 26 may further include the Generative AI Large Language Model-based autonomous primary agent reporting a reasoning (e.g. text based description of the reasoning) behind the classification of the alarm as a false alarm or a true alarm, as indicated at block 44. In some cases, one or more of the plurality of Generative Artificial Intelligence (AI) Large Language Model-based autonomous primary agents and/or one or more of the Generative AI Large Language Model-based autonomous subagents may be configured to gather data from one or more of the plurality of BMS components of the BMS. In some cases, the Generative AI Large Language Model-based autonomous primary agent may report gathered data that support the classification of the alarm as a false alarm or a true alarm. In some cases, one or more of the plurality of Generative Artificial Intelligence (AI) Large Language Model-based autonomous primary agents and/or one or more of the Generative AI Large Language Model-based autonomous subagents may change an operation of one or more of the plurality of BMS components (e.g. turn on, turn off, change a mode, change a speed, change a setpoint, change a schedule, etc.) in response to classifying the alarm as a true alarm, and does not change the operation of one or more of the plurality of BMS components in response to classifying the alarm as a false alarm, as indicated at block 46.

FIGS. 3A and 3B are flow diagrams that together show an illustrative series of steps 48 that may be carried out by one or more processors that are executing instructions stored on a non-transitory computer readable medium. The one or more processors may be part of the controller 20, for example. The one or more processors may be caused to receive a plurality of alarms from a BMS, wherein each of the plurality of alarms have an alarm type, as indicated at block 50. For at least some of the plurality of alarms, the one or more processors may be caused to activate a corresponding one of a plurality of Generative Artificial Intelligence (AI) Large Language Model-based autonomous primary agents based at least in part on the alarm type of the respective alarm, where the corresponding Generative AI Large Language Model-based autonomous primary agent is trained using domain knowledge that corresponds to the alarm type of the respective alarm, as indicated at block 52.

The corresponding Generative AI Large Language Model-based autonomous primary agent performs an initial analysis of the respective alarm and creates one or more plausible causes for the respective alarm and/or one or more plausible contributors to the alarm, wherein each of the one or more plausible causes/contributors relates to one or more corresponding domains of a plurality of domains, as indicated at block 54. The corresponding Generative AI Large Language Model-based autonomous primary agent autonomously assigns each of one or more of the plausible causes/contributors to one or more of a plurality of Generative AI Large Language Model-based autonomous subagents based at least in part on the one or more domains of the respective plausible cause/contributor, where each of the corresponding Generative AI Large Language Model-based autonomous subagent is trained using domain knowledge that corresponds to the respective domain of the plausible cause, as indicated at block 56. Each of the Generative AI Large Language Model-based autonomous subagents perform an analysis of the assigned plausible cause/contributor and return a result back to the Generative AI Large Language Model-based autonomous primary agent that assigned the plausible cause/contributor to the respective Generative AI Large Language Model-based autonomous subagent, as indicated at block 58.

Continuing on FIG. 3B, the Generative AI Large Language Model-based autonomous primary agent receives the result from each of the Generative AI Large Language Model-based autonomous subagents that were assigned a respective plausible cause/contributor from the Generative AI Large Language Model-based autonomous primary agent, and based at least in part on the received results, classifies the alarm as a false alarm or a true alarm, as indicated at block 60. In some cases, one or more of the Generative AI Large Language Model-based autonomous subagents, when performing the analysis of the assigned plausible cause/contributor, may autonomously assign one or more sub-tasks to one or more of the plurality of Generative AI Large Language Model-based autonomous sub-agents based at least in part on the domain of the sub-task and the domain knowledge that the corresponding Generative AI Large Language Model-based autonomous subagent was trained, as indicated at block 62. In some cases, the Generative AI Large Language Model-based autonomous primary agent reports a confidence score in the classification of the alarm as a false alarm or a true alarm, as indicated at block 64. In some cases, the Generative AI Large Language Model-based autonomous primary agent may report a reasoning behind the classification of the alarm as a false alarm or a true alarm, as indicated at block 66.

Figure 4A:
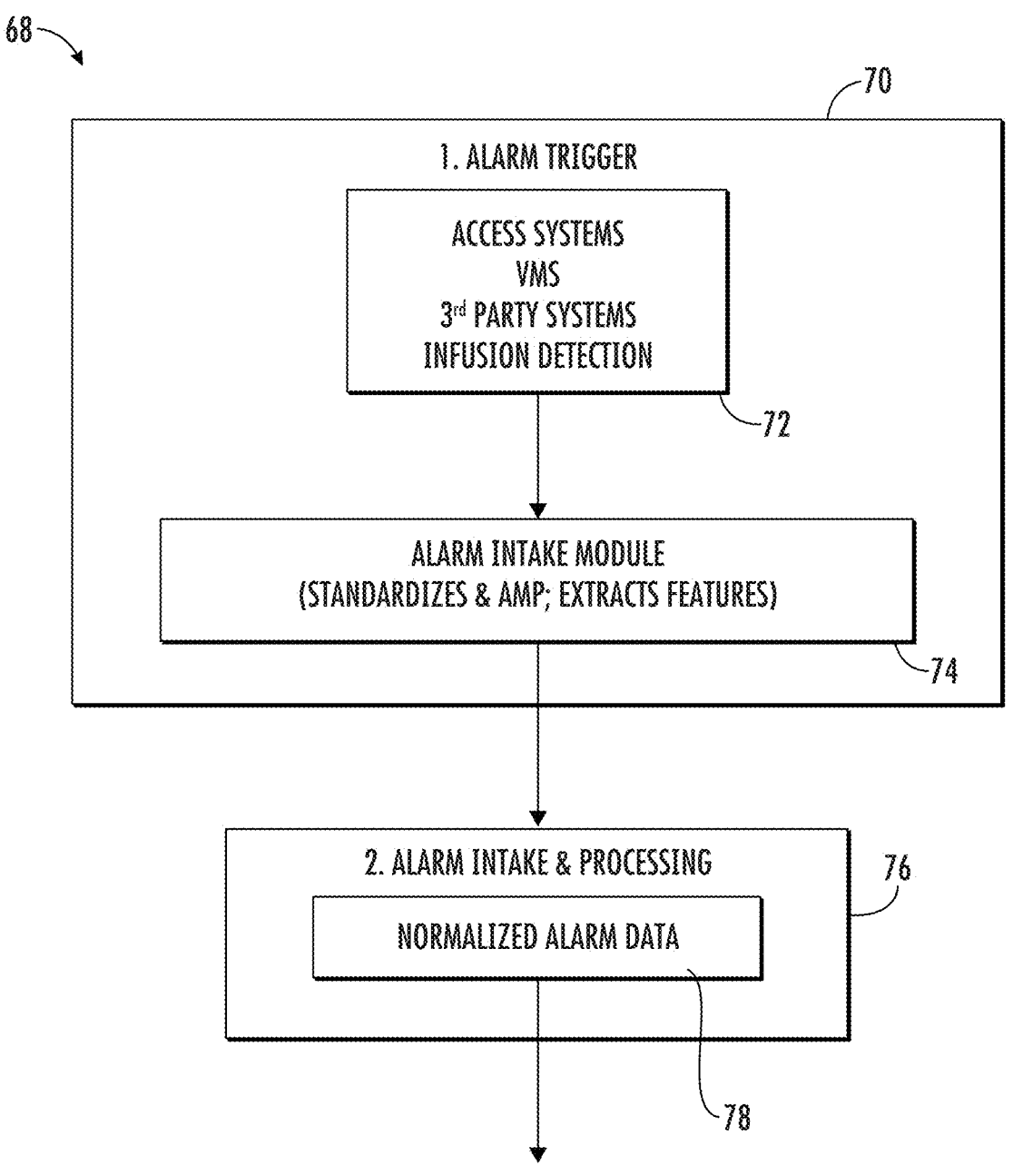
FIGS. 4A, 4B and 4C are flow diagrams that together show an illustrative method.
Figure 4B:
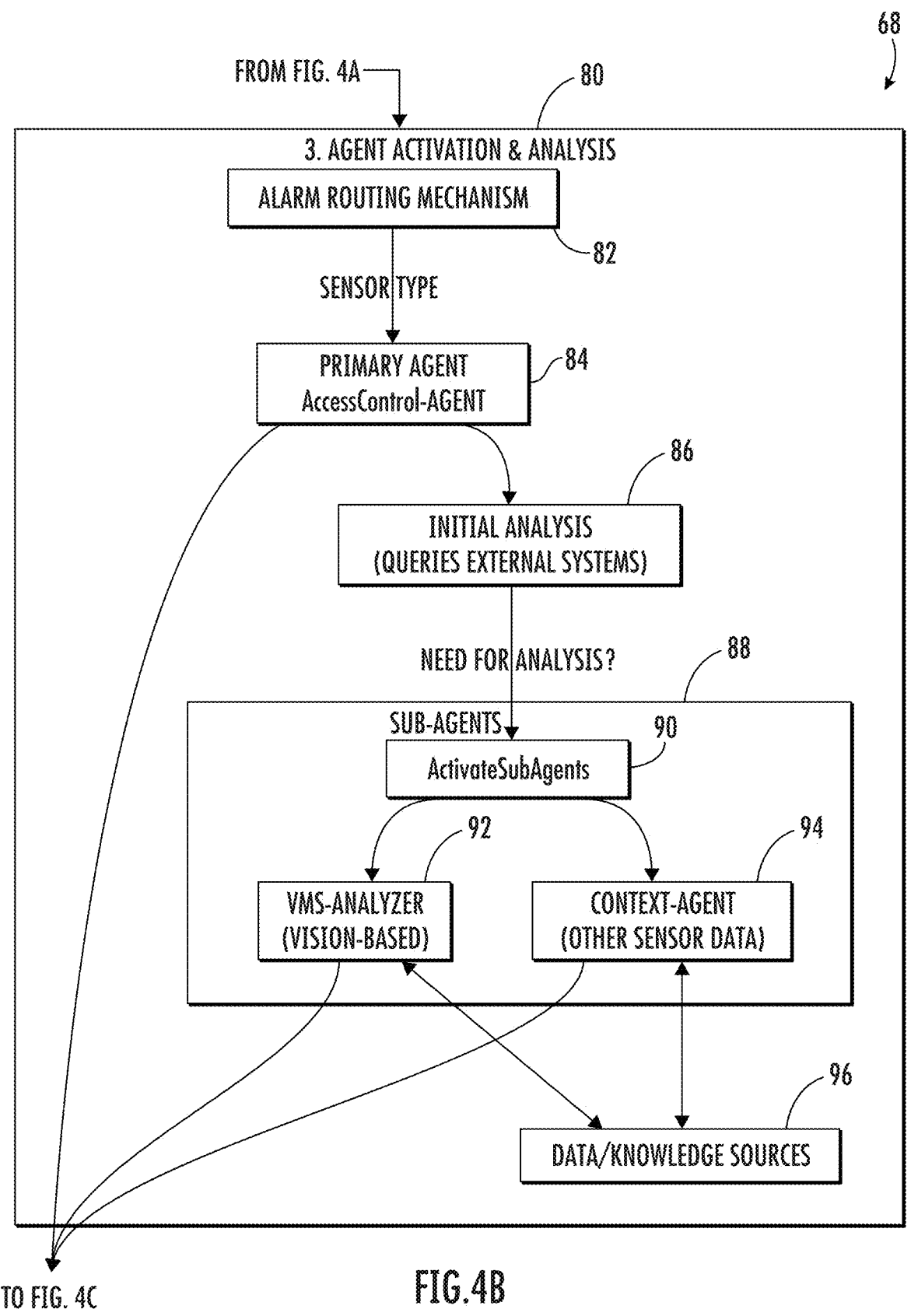
Figure 4C:
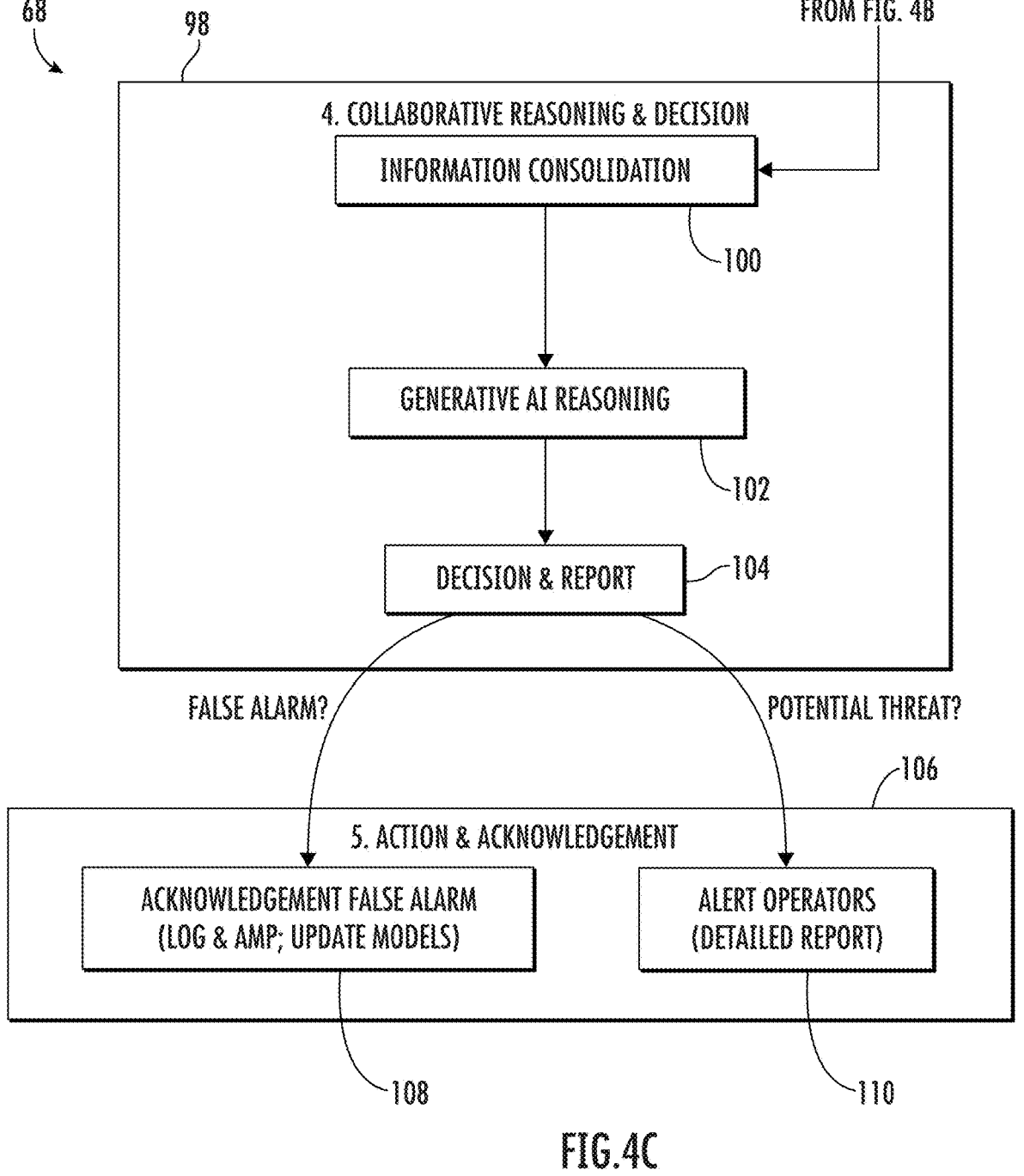

FIGS. 4A, 4B and 4C are flow diagrams that together show an illustrative method 68. The method 68 begins with an alarm trigger, as indicated at block 70. In some cases, the alarm trigger may include indications of an alarm from one or more of an access system, a VMS (Video Management System), an intrusion detection system and/or various third party systems, as indicated at block 72. An alarm intake module normalizes the incoming alarm(s) to a common format and extracts certain alarm features including an alarm type and an alarm time stamp, as indicated at block 74. Next, the incoming alarm(s) are taken in and processed, as indicated at block 76. In some cases, intake and processing may include normalizing the alarm data (e.g. convert all temperatures values to degrees Fahrenheit, convert all time entries to a 24-hour clock value, etc.), as indicated at block 78.

The method 68 continues on FIG. 4B, where analysis of the alarm occurs, as indicated at block 80. This may include an alarm routing mechanism, as indicated at block 82. This may include identifying the sensor type and/or alarm type, for example. A primary agent such as one of the Generative AI Large Language Model-based autonomous primary agents 22 may be accessed, as indicated at block 84. In some cases, control passes to block 86, where an initial analysis occurs. In some cases, control may alternatively (or additionally) pass to block 100 on FIG. 4C, where information consolidation occurs. From block 86, control passes to block 88, where a determination is made as to whether further analysis is appropriate. In some cases, a subagent such as one of the Generative AI Large Language Model-based autonomous subagents 24, may be activated, as indicated at block 90. In some cases, control may pass to vision-based analysis, as indicated at block 92, and/or to context-based analysis (other sensor data), as indicated at block 94. The vision-based analysis at block 92 and/or the context-based analysis at block 94 may access data and/or domain knowledge from data knowledge sources block 96. From the vision-based analysis at block 92, control may pass to block 100 on FIG. 4C. From the context-based analysis at block 94, control may pass to block 100 on FIG. 4C.

FIG. 4C begins with collaborative reasoning and decision making, as indicated at block 98. This may include information consolidation, as indicated at block 100, generative AI reasoning, as indicated at block 102, and a decision and report, as indicated at block 104. Control then passes to action and acknowledgement, as indicated at block 106. If an alarm is determined to be a false alarm, the false alarm may be automatically logged and acknowledged without operator input, as indicated at block 108. If an alarm is determined to not be a false alarm, and thus is a true alarm, the operators are alerted, as indicated at block 110.

To illustrate with concrete examples, in a first scenario, an alarm is triggered indicating that "An unauthorized person has intruded a specific area" of a facility. In this example, this alarm is raised by an intrusion video analytics algorithm of a Video Management System (VMS). This alarm scenario may be handled using the following steps.

1. Alarm Trigger
2. Alarm Intake and Initial Processing
   Alarm Intake Module:
   Normalization: The raw alarm data from the VMS is standardized, including:
      Timestamp: Precise time of the event.
      Location: Specific area where the intrusion was detected.
      Sensor Type: Video analytics.
      Severity Level: High, due to unauthorized intrusion.
      Initial Description: Text description from the VMS analytics indicating unauthorized intrusion.
3. Agent Activation and Initial Scenario Generation
   Primary Agent
   Role: A generative AI model that acts as the central processing unit for alarms.
   Initial Scenario Generation:
   The primary agent analyzes the type of event and the source (VMS).
   It creates one or more initial scenarios such as:
      Unauthorized intrusion by a known individual.
      False alarm due to sensor error.
      Environmental factors affecting sensor accuracy.
   Alarm Routing: Based on the initial scenarios, the primary agent assigns the alarm to one or more relevant sub-agents.

4. Sub-Agent Activation and Analysis

VMS Agent (Video Management System Agent)

Activation:

The primary agent activates the VMS sub-agent, which is trained in handling video analytics alarms.

Domain Knowledge:

The VMS sub-agent has detailed domain knowledge of video analytics, camera placements, typical intrusion patterns, and historical data.

Data Collection:

The VMS sub-agent interacts with the live VMS to gather additional information such as:

Video Feeds: Live and recorded feeds from surrounding cameras.

Movement Patterns: Analyzes the movement of the intruder.

Facial Recognition: Attempts to identify the person using facial recognition.

Scenario Update:

Updates the initial scenarios based on the new video evidence and assigns confidence levels to each scenario.

Activation of Additional Sub-Agents

Depending on the findings of the primary agent and/or the sub agents, update the confidence levels of the existing scenarios and/or create new scenarios if necessary and assigns the new scenarios to appropriate sub-agents.

Environmental Monitoring Agent:

Trigger: Based on updated scenarios, the primary agent or sub-agents determine the need for environmental data.

Data Collection:

Gathers data from environmental sensors (e.g., temperature, humidity, motion sensors) to check for unusual conditions.

Scenario Update:

Provides its findings, leading to further updates in the scenarios and their confidence levels.

5. Dynamic Collaboration and Decision Making Collaborative Reasoning:

The primary agent consolidates information from all active sub-agents.

Updates scenarios dynamically as new evidence is collected.

If any scenario requires additional information, the primary agent or sub-agents trigger further sub-agent activation.

Generative AI Reasoning:

Scenario Refinement: Continuously refines scenarios based on new data.

Probability Assignment: Adjusts probabilities for each scenario based on the totality of evidence and the generative AI's knowledge base.

Decision and Report:

Classification: Determines if the alarm is a false alarm or an actual threat.

Detailed Report: Compiles a report with:

Key evidence from video feeds, access logs, and environmental data.

Reasoning behind the decision.

Confidence level in the decision.

Recommended actions (e.g., dispatch security, ignore the alarm).

6. Action and Acknowledgement

False Alarm:

Logging: Logs the incident for future analysis and model training.

Self-Calibration: Updates the model's understanding of normal baselines to reduce future false alarms.

Potential Threat:

Alert Operators: Sends detailed alerts to human operators with the compiled report.

Immediate Response: Provides operators with actionable insights to respond to the threat quickly.

In another example, an alarm is triggered indicating that "A fire has been detected in a storage area." This alarm is raised by a combination of smoke detectors, heat sensors, and video analytics. This alarm scenario may be handled using the following steps.

1. Alarm Trigger

Event: A fire is detected in a storage area.

Sources: The alarm is raised by multiple sources:

Smoke Detectors: Detecting smoke in the area.

Heat Sensors: Detecting a rapid increase in temperature.

Video Analytics: Detecting visual signs of fire or smoke.

2. Alarm Intake and Initial Processing

Alarm Intake Module:

Normalization: The raw alarm data from different sensors is standardized, including:

Timestamp: Precise time of the event.

Location: Specific storage area where the fire is detected.

Sensor Types: Smoke detector, heat sensor, video analytics.

Severity Level: Critical, due to potential fire hazard.

Initial Description: Text description from the sensors indicating fire detection.

3. Agent Activation and Initial Scenario Generation Primary Agent

Role: A generative AI model that acts as the central processing unit for alarms.

Initial Scenario Generation:

The primary agent analyzes the type of alarms and the sources (smoke detectors, heat sensors, video analytics).

It creates initial scenarios such as:

Actual fire in the storage area.

False alarm due to sensor malfunction.

Environmental factors (e.g., dust or steam) triggering false positives.

Alarm Routing: Based on the initial scenarios, the primary agent directs the alarm to the relevant sub-agents.

4. Sub-Agent Activation and Analysis

Fire Detection Agent

Activation:

The primary agent activates the Fire Detection Agent, which is trained in handling fire-related alarms.

Domain Knowledge:

The Fire Detection Agent has detailed domain knowledge of fire detection sensors, typical fire behavior, and historical data.

Data Collection:

The Fire Detection Agent interacts with the live systems to gather additional information such as:

Sensor Readings: Current and historical readings from smoke detectors and heat sensors.

Video Feeds: Live and recorded feeds from cameras in the storage area.

Scenario Update:

Updates the initial scenarios based on the new sensor and video evidence and assigns confidence levels to each scenario.

13

14

Activation of Additional Sub-Agents as necessary

Environmental Monitoring Agent:

Trigger: The Fire Detection Agent or primary agent determines the need for environmental data.

Data Collection:

Gathers data from environmental sensors (e.g., humidity, dust levels, air quality) to check for unusual conditions.

Scenario Update:

Provides its findings to the primary agent, which updates the confidence levels of the existing scenarios and/or creates new scenarios if necessary.

Maintenance Agent:

Trigger: Based on updated scenarios, the primary agent or sub-agents determine the need for maintenance data.

Data Collection:

Queries the maintenance system for recent maintenance logs and reports any recent work done on the fire detection system or in the storage area.

Scenario Update:

Provides its findings, leading to further updates in the scenarios and their confidence levels.

5. Dynamic Collaboration and Decision Making

Collaborative Reasoning:

The primary agent consolidates information from all active sub-agents.

Updates scenarios dynamically as new evidence is collected.

If any scenario requires additional information, the primary agent or sub-agents trigger further sub-agent activation.

Generative AI Reasoning:

Scenario Refinement: Continuously refines scenarios based on new data.

Probability Assignment: Adjusts probabilities for each scenario based on the totality of evidence and the generative AI's knowledge base.

Decision and Report:

Classification: Determines if the alarm is a false alarm or an actual fire threat.

Detailed Report: Compiles a report with:

Key evidence from sensor readings, video feeds, and environmental data.

Reasoning behind the decision.

Confidence level in the decision.

Recommended actions (e.g., dispatch fire services, ignore the alarm).

6. Action and Acknowledgement

False Alarm:

Logging: Logs the incident for future analysis and model training.

Self-Calibration: Updates the model's understanding of normal baselines to reduce future false alarms.

Potential Threat:

Alert Operators: Sends detailed alerts to human operators with the compiled report.

Immediate Response: Provides operators with actionable insights to respond to the fire threat quickly.

Using a multi-agent system as described herein, rather than a single LLM, emulates multiple human domain experts sitting together and analyzing the alarm. Each agent is specialized in its domain, questioning each other's decisions, cross-verifying information, and collaborating to gather insights. This may provide enhanced reasoning and robust backing for decisions. Additionally, this approach helps counter hallucinations of generative AI systems by providing a mechanism for cross-validation and continuous refinement of scenarios based on diverse inputs from multiple experts.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for alarm processing of alarms of a Building Management System (BMS) of a facility, wherein the BMS includes a plurality of BMS components placed at known locations about the facility where the plurality of BMS components include a plurality of sensors, the method comprising:

receiving a plurality of alarms from the BMS;

normalizing each of the plurality of alarms into a normalized alarm format, wherein the normalized alarm format includes at least an alarm type and an alarm timestamp;

for at least some of the plurality of alarms, activating a corresponding one of a plurality of Generative Artificial Intelligence (AI) Large Language Model-based autonomous primary agents based at least in part on the alarm type of the respective alarm, where the corresponding Generative AI Large Language Model-based autonomous primary agent is trained using domain knowledge that corresponds to the alarm type of the respective alarm;

the corresponding Generative AI Large Language Model-based autonomous primary agent performing an initial analysis of the respective alarm and creating one or more initial scenarios for determining whether the respective alarm is a false alarm or a true alarm, wherein each of the one or more initial scenario relates to one or more scenario domains;

the corresponding Generative AI Large Language Model-based autonomous primary agent autonomously assigning each of one or more of the initial scenarios to one or more of a plurality of Generative AI Large Language Model-based autonomous subagents based at least in part on the one or more scenario domains of the respective initial scenario, where each of the corresponding Generative AI Large Language Model-based autonomous subagent is trained using domain knowledge that corresponds to the respective scenario domain;

each of the Generative AI Large Language Model-based autonomous subagents performing an analysis of the assigned initial scenario and returning a result back to the Generative AI Large Language Model-based autonomous primary agent that assigned the initial scenario to the respective Generative AI Large Language Model-based autonomous subagent; and the Generative AI Large Language Model-based autonomous primary agent receiving the result from each of the Generative AI Large Language Model-based autonomous subagents that were assigned a respective initial scenario from the Generative AI Large Language Model-based autonomous primary agent, and based at least in part on the received results, classifying the alarm as a false alarm or a true alarm.

2. The method of claim 1, wherein one or more of the Generative AI Large Language Model-based autonomous subagents, when performing the analysis of the assigned initial scenario, autonomously assigning one or more sub-tasks to one or more of the plurality of Generative AI Large Language Model-based autonomous subagents based at least in part on the domain of the sub-task and the domain knowledge that the corresponding Generative AI Large Language Model-based autonomous subagent was trained.

3. The method of claim 1, wherein the Generative AI Large Language Model-based autonomous primary agent reporting a confidence score in the classification of the alarm as a false alarm or a true alarm.

4. The method of claim 1, wherein the Generative AI Large Language Model-based autonomous primary agent reporting a reasoning behind the classification of the alarm as a false alarm or a true alarm.

5. The method of claim 1, wherein one or more of the plurality of Generative Artificial Intelligence (AI) Large Language Model-based autonomous primary agents and/or one or more of the Generative AI Large Language Model-based autonomous subagents is configured to gather data from one or more of the plurality of BMS components of the BMS.

6. The method of claim 5, wherein the Generative AI Large Language Model-based autonomous primary agent reporting gathered data that support the classification of the alarm as a false alarm or a true alarm.

7. The method of claim 1, wherein one or more of the plurality of Generative Artificial Intelligence (AI) Large Language Model-based autonomous primary agents and/or one or more of the Generative AI Large Language Model-based autonomous subagents changes an operation of one or more of the plurality of BMS components in response to classifying the alarm as a true alarm, and does not change the operation of one or more of the plurality of BMS components in response to classifying the alarm as a false alarm.

8. The method of claim 1, wherein one or more of the plurality of BMS components includes one or more Video Management System (VMS) components of a Video Management System (VMS) of the BMS, and one of the Generative AI Large Language Model-based autonomous subagents is a Video Management System (VMS) Analyzer subagent that is trained using domain knowledge related to the Video Management System (VMS) of the BMS.

9. The method of claim 1, wherein one or more of the plurality of BMS components includes one or more Fire Detection components of a Fire Detection System of the BMS, and one of the Generative AI Large Language Model-based autonomous subagents is a Fire Detection Analyzer subagent that is trained using domain knowledge related to the Fire Detection System of the BMS.

10. The method of claim 1, wherein one or more of the plurality of BMS components includes one or more Security System components of a Security System of the BMS, and one of the Generative AI Large Language Model-based autonomous subagents is a Security System Analyzer sub-agent that is trained using domain knowledge related to the Security System of the BMS.

11. The method of claim 1, wherein one or more of the plurality of BMS components includes one or more Heating, Ventilation and/or Air Conditioning (HVAC) components of an HVAC system of the BMS, and one of the Generative AI Large Language Model-based autonomous subagents is HVAC Analyzer subagent that is trained using domain knowledge related to the HVAC system of the BMS.

12. A system for alarm processing of alarms of a Building Management System (BMS) of a facility, wherein the BMS includes a plurality of BMS components placed at known locations about the facility where the plurality of BMS components include a plurality of sensors, the system comprising:

an input/output;

a controller operatively coupled to the input/output, the controller configured to:

receive a plurality of alarms from the BMS via the input/output, wherein each of the plurality of alarms has an alarm type;

for at least some of the plurality of alarms, activate a corresponding one of a plurality of Generative Artificial Intelligence (AI) Large Language Model-based autonomous primary agents based at least in part on the alarm type of the respective alarm, where the corresponding Generative AI Large Language Model-based autonomous primary agent is trained using domain knowledge that corresponds to the alarm type of the respective alarm;

the corresponding Generative AI Large Language Model-based autonomous primary agent performs an initial analysis of the respective alarm and creates one or more plausible causes for the respective alarm, wherein each of the one or more plausible causes relates to one or more corresponding domains of a plurality of domains;

the corresponding Generative AI Large Language Model-based autonomous primary agent autonomously assigns each of one or more of the plausible causes to one or more of a plurality of Generative AI Large Language Model-based autonomous sub-agents based at least in part on the one or more domains of the respective plausible cause, where each of the corresponding Generative AI Large Language Model-based autonomous subagent is trained using domain knowledge that corresponds to the respective domain of the plausible cause;

each of the Generative AI Large Language Model-based autonomous subagents performs an analysis of the assigned plausible cause and returns a result back to the Generative AI Large Language Model-based autonomous primary agent that assigned the plausible cause to the respective Generative AI Large Language Model-based autonomous subagent; and the Generative AI Large Language Model-based autonomous primary agent receiving the result from each of the Generative AI Large Language Model-based autonomous subagents that were assigned a respective plausible cause from the Generative AI Large Language Model-based autonomous primary agent, and based at least in part on the received results, classifying the alarm as a false alarm or a true alarm.

13. The system of claim 12, wherein one or more of the Generative AI Large Language Model-based autonomous subagents, when performing the analysis of the assigned plausible cause, autonomously assigning one or more sub-tasks to one or more of the plurality of Generative AI Large Language Model-based autonomous subagents based at least in part on the domain of the sub-task and the domain knowledge that the corresponding Generative AI Large Language Model-based autonomous subagent was trained.

14. The system of claim 12, wherein the Generative AI Large Language Model-based autonomous primary agent reports a confidence score in the classification of the alarm as a false alarm or a true alarm.

15. The system of claim 12, wherein the Generative AI Large Language Model-based autonomous primary agent reports a reasoning behind the classification of the alarm as a false alarm or a true alarm.

16. The system of claim 12, wherein one or more of the plurality of Generative Artificial Intelligence (AI) Large Language Model-based autonomous primary agents and/or one or more of the Generative AI Large Language Model-based autonomous subagents gathers data from one or more of the plurality of BMS components of the BMS, and the Generative AI Large Language Model-based autonomous primary agent reports gathered data that support the classification of the alarm as a false alarm or a true alarm.

17. A non-transitory computer readable medium storing instructions that when executed by one or more processors causes the one or more processors to:

receive a plurality of alarms from a BMS, wherein each of the plurality of alarms have an alarm type;

for at least some of the plurality of alarms, activate a corresponding one of a plurality of Generative Artificial Intelligence (AI) Large Language Model-based autonomous primary agents based at least in part on the alarm type of the respective alarm, where the corresponding Generative AI Large Language Model-based autonomous primary agent is trained using domain knowledge that corresponds to the alarm type of the respective alarm;

the corresponding Generative AI Large Language Model-based autonomous primary agent performs an initial analysis of the respective alarm and creates one or more plausible causes for the respective alarm, wherein each of the one or more plausible causes relates to one or more corresponding domains of a plurality of domains;

the corresponding Generative AI Large Language Model-based autonomous primary agent autonomously assigns each of one or more of the plausible causes to one or more of a plurality of Generative AI Large Language Model-based autonomous subagents based at least in part on the one or more domains of the respective plausible cause, where each of the corresponding Generative AI Large Language Model-based autonomous subagent is trained using domain knowledge that corresponds to the respective domain of the plausible cause;

each of the Generative AI Large Language Model-based autonomous subagents performs an analysis of the assigned plausible cause and returns a result back to the Generative AI Large Language Model-based autonomous primary agent that assigned the plausible cause to the respective Generative AI Large Language Model-based autonomous subagent; and the Generative AI Large Language Model-based autonomous primary agent receiving the result from each of the Generative AI Large Language Model-based autonomous subagents that were assigned a respective plausible cause from the Generative AI Large Language Model-based autonomous primary agent, and based at least in part on the received results, classifying the alarm as a false alarm or a true alarm.

18. The non-transitory computer readable medium of claim 17, wherein one or more of the Generative AI Large Language Model-based autonomous subagents, when performing the analysis of the assigned plausible cause, autonomously assigning one or more sub-tasks to one or more of the plurality of Generative AI Large Language Model-based autonomous subagents based at least in part on the domain of the sub-task and the domain knowledge that the corresponding Generative AI Large Language Model-based autonomous subagent was trained.

19. The non-transitory computer readable medium of claim 17, wherein the Generative AI Large Language Model-based autonomous primary agent reports a confidence score in the classification of the alarm as a false alarm or a true alarm.

20. The non-transitory computer readable medium of claim 17, wherein the Generative AI Large Language Model-based autonomous primary agent reports a reasoning behind the classification of the alarm as a false alarm or a true alarm.

\* \* \* \* \*